(12) United States Patent
Hedde et al.

(10) Patent No.: US 8,643,826 B2
(45) Date of Patent: Feb. 4, 2014

(54) METHOD FOR INCREASING THROUGHPUT AND REDUCING BLURRINESS DUE TO MOVEMENT

(75) Inventors: John Hedde, Lüneburg (DE); Guido Ebeling, Ratzeburg (DE); Sascha Neber, Adendorf (DE)

(73) Assignee: Xeikon IP BV, GZ Eede (NL)

( * ) Notice: Subject to any disclaimer, the term of this patent is extended or adjusted under 35 U.S.C. 154(b) by 941 days.

(21) Appl. No.: 12/673,056

(22) PCT Filed: Jul. 22, 2008

(86) PCT No.: PCT/EP2008/005970
§ 371 (c)(1),
(2), (4) Date: Feb. 23, 2010

(87) PCT Pub. No.: WO2009/024225
PCT Pub. Date: Feb. 26, 2009

(65) Prior Publication Data
US 2011/0273689 A1 Nov. 10, 2011

(30) Foreign Application Priority Data
Aug. 17, 2007 (DE) .......................... 10 2007 038 999

(51) Int. Cl.
*G03B 27/32* (2006.01)
*G03B 27/68* (2006.01)
*G03B 27/54* (2006.01)
*G03B 27/42* (2006.01)

(52) U.S. Cl.
USPC .................... 355/77; 355/52; 355/53; 355/67

(58) Field of Classification Search
USPC ........... 355/52, 53, 55, 67–71, 77; 250/492.1, 250/492.2, 492.22, 548; 430/5, 8, 22, 30, 430/311, 312, 322
See application file for complete search history.

(56) References Cited

U.S. PATENT DOCUMENTS

| 5,343,271 | A | * | 8/1994 | Morishige ........................ 355/53 |
| 5,523,193 | A | * | 6/1996 | Nelson .......................... 430/311 |
| 5,691,541 | A | * | 11/1997 | Ceglio et al. ............... 250/492.1 |
| 5,696,590 | A | * | 12/1997 | Makita .......................... 356/399 |
| 5,936,710 | A | * | 8/1999 | Itoh et al. ........................ 355/53 |

(Continued)

OTHER PUBLICATIONS

Written Opinion of the International Searching Authority of International Application No. PCT/EP2008/005970.

*Primary Examiner* — Toan Ton
*Assistant Examiner* — Christina Riddle
(74) *Attorney, Agent, or Firm* — Notaro, Michalos & Zaccaria P.C.

(57) ABSTRACT

A method for illuminating printing plates in which the light from a light source is imaged on a two-dimensional light modulator having a plurality of rows of light-modulated cells, and the light is modulated thereby, whereupon the light modulator is imaged on light-sensitive material via an imaging beam path, wherein the light-sensitive material is moved relative to the light modulator substantially perpendicularly to the direction of the rows of light-modulated cells at a relative speed and wherein the data pattern to be imaged on the light-sensitive material is displayed beginning in the first row of the light modulator in each row consecutively during an exposure time (T, T') and then moved to the subsequent row of the light modulator. In order to improve the method, the image of the data pattern is held substantially stationary relative to the light-sensitive material during the exposure time (T, T').

23 Claims, 4 Drawing Sheets

(56) References Cited

U.S. PATENT DOCUMENTS

| | | | |
|---|---|---|---|
| 6,133,986 A * | 10/2000 | Johnson | 355/67 |
| 6,312,134 B1 * | 11/2001 | Jain et al. | 359/855 |
| 6,323,984 B1 * | 11/2001 | Trisnadi | 359/245 |
| 6,399,261 B1 * | 6/2002 | Sandstrom | 430/30 |
| 6,504,567 B1 * | 1/2003 | Pagan | 347/255 |
| 6,590,633 B1 * | 7/2003 | Nishi et al. | 355/53 |
| 6,646,721 B2 * | 11/2003 | Compter et al. | 355/72 |
| 6,881,963 B2 * | 4/2005 | Ito | 250/491.1 |
| 2002/0196226 A1 * | 12/2002 | Tegreene et al. | 345/103 |
| 2004/0141166 A1 * | 7/2004 | Bleeker et al. | 355/53 |

\* cited by examiner

METHOD FOR INCREASING THROUGHPUT AND REDUCING BLURRINESS DUE TO MOVEMENT

BACKGROUND OF THE INVENTION

The present invention relates to a method for exposing printing plates, in which light from a light source is imaged on a two-dimensional light modulator with a multiplicity of rows of light-modulating cells and is modulated by them, whereupon the light modulator is imaged via an imaging optical path onto light-sensitive material, wherein the light sensitive material is moved substantially perpendicularly to the direction of the rows of light-modulating cells relative to the light modulator at a relative speed, and wherein the data patterns to be imaged on the light-sensitive material, starting in the first utilized row of the light modulator, are each sequentially displayed in every row during a holding time, and subsequently are displaced to the particular following row of the light modulator until data patterns are displaced out of the last utilized row, with a shifting or displacement rate, through which the image of a given data pattern is, on average, kept stationary relative to the light sensitive material.

The invention also relates to an exposure and modulation arrangement for carrying out the method of the above described type, with a light source, a two-dimensional light modulator, with a multiplicity of rows of light-modulating cells, with a device for imaging on the light modulator, with a device for imaging the light modulator on light sensitive material, with a device for generating a relative movement between the light modulator and the light sensitive material, wherein the direction of the relative movement extends substantially perpendicularly to the direction of the rows of light-modulating cells, as well as with a device for displaying during a holding time, and subsequently displacing, a data pattern through the several columns of the light modulator, at a displacement rate, through which the image of a given data pattern is kept, on average, stationary relative to the light sensitive material during the movement.

The generic method and the generic arrangement are disclosed, for example, in DE 41 21 509 A1. Such arrangements and methods are of significance in particular for processes in which large quantities of modulated light in the blue and ultraviolet range are required, such as, for example, in the exposure of printing plates, the exposure of printed circuits and in stereolithography. The underlying principle is that the light sensitive material is continuously moved, while the image content is scrolled through the light modulator at like speed in the opposite direction. The image content thus remains nearly stationary on the material to be exposed. The exposure builds up through the integration of all short individual exposures of the cells of a row. In this manner strips with a width corresponding to the number of rows of the light modulator are exposed. By placing several strips next to one another, a larger area is exposed.

Problematic in this exposure principle is basically, on the one hand, the extremely large data quantity, which must be transmitted for each exposure step. The data transmission rate between an activating electronic circuitry and the light modulator is herein limited by nature. As the light modulators are utilized, for example, two-dimensional micromirror rows (DMD™), liquid crystal displays, diffraction gratings, light valves or reflecting liquid crystal lines (LCOS). If the printing plates to be exposed are sufficiently sensitive and/or if the radiative flow provided by the light source has reached a certain magnitude, the throughput of a generic arrangement, measured in numbers of exposed printing plates per hour or in exposed square meters per hour, is limited by the data rate at which data can be transmitted to the display. The data rate in the conventional generic scrolling methods is limiting for the throughput, since the complete light modulator must be written anew every time the image is advanced by one row.

In order to increase the throughput nevertheless, DE 10 2005 015 193 A1, for example, has proposed decreasing the number of lines actually used by the light modulator and activated compared to the number of physically available lines. However, of disadvantage herein is that the range of the system is decreased which, in turn, decreases the magnitude of the radiative flow.

A further problem in conventional scrolling methods of the above described type is that the relative movement between the light modulator and the light sensitive material is a continuous movement, whereas the movement of the data pattern on the light modulator is an abrupt movement. The latter can be traced back to the fact that the movement, thus the scrolling, of the data pattern across the light modulator can only occur in discrete steps, wherein the step width is predetermined by the number of rows and the width of the light modulating cells. The data patterns thus do not move continuously across the light modulator, but rather are, instead, displayed in a row during a holding time, during which the data pattern does not move and subsequently jumps quasi abruptly to the adjacent row. Consequently, the image of a given data pattern can only be kept, on average, stationary relative to the light sensitive material. However, the image of the data pattern, in fact, moves during the holding time on the light sensitive material at a rate corresponding to the relative speed between the light modulator and the light sensitive material. This movement of the image of the data pattern during the holding times leads, according to prior art without further measures, to the fuzziness, as a consequence of the principle, of the exposure of the width of a light modulating cell of the light modulator.

DE 41 21 509 A1 therefore proposed that the image of the light modulator on the material to be exposed is reduced by means of a lens, such that the exposed area on the material to be exposed due to the blurring in the end result receives again the original size. However, of disadvantage herein is that the layout of the reducing optical system can under certain circumstances be problematic, in particular if the relative speed between the material to be exposed and the light modulator as well as the holding time should or must be varied. In principle, in these cases the reducing lens would have to be adapted to the new parameters. However, this is disadvantageously only possible with comparatively complex and expensive additional optical components.

BRIEF SUMMARY OF THE INVENTION

The present invention therefore addresses the problem of increasing the throughput in the generic method and of the generic arrangement. According to another aspect of the invention the problem is improving the method and the arrangement of the aforementioned type such that variations of the throughput can be carried out without a blurring of the image of the light modulator on the light sensitive material occurring.

According to the invention this problem is resolved thereby that in a method of the aforementioned type the imaging of the data pattern during the holding time is kept substantially stationary relative to the light sensitive material. Through this measure it is feasible to reduce the displacement rate of the data pattern over the rows of the light modulator to increase the throughput. Through the reduction of this displacement rate the data quantity to be transmitted is reduced and it is feasible to select a higher relative speed between the light modulator and the light sensitive material, whereby the throughput is increased. Thereby that, according to the invention, the image of the data pattern, during the holding time extended in the described manner, is kept substantially stationary relative to the light sensitive material, no blurring of the image on the light sensitive material occurs. Consequently, the data rate to be transmitted can with advantage be lowered, which leads to the increase of the throughput without quality losses occurring during the exposure.

On the other hand, the holding time could be shortened according to the invention in order to attain that the image of the data pattern, due to the short holding times, is virtually stationary on the light sensitive material although, in principle, a relative movement between the image and the light sensitive material exists.

In an advantageous physical form of the invention is provided that the relative movement between the light modulator and the light sensitive material during the holding time is substantially compensated. Through this measure it becomes feasible to increase the holding time without a blurring of the image of the light modulator on the printing material being generated.

If in preferred physical form of the invention the image of the data pattern relative to the light modulator is moved with a periodic movement profile, it is advantageously feasible to compensate during the holding time especially effectively the relative movement between the light modulator and the light sensitive material. Herewith, for example, an update of the data pattern imaged on the light modulator can take place only every second row. The data rate to the light modulator is hereby halved. Nevertheless, the full resolution is retained without the blurring which occurs in conventional scrolling methods.

The method according to the invention is still further improved if the movement profile has a gradual, increasing slope and a steep, decreasing slope, in particular a sawtooth shape. In principle, onto the constant relative movement between the light modulator and the photosensitive material an additional movement of the image of the light modulator relative to the overall exposure unit is superimposed as an inertial system. Through the gradual, increasing slope is attained that the relative movement of the image of the light modulator and the photosensitive material to be exposed is most of the time zero, thus is completely cancelled. Thus, if, for example, the relative movement between light modulator and the material to be exposed is realized such that the light modulator is traversed over the light sensitive material fixed in the exposure unit, the picture, due to the movement profile during the holding time, is kept stationary on the printing material to be exposed, although the light modulator continues to move with respect to the printing plate. The additionally superimposed periodic, in particular sawtooth-shaped, movement consequently during the holding time acts counter to this relative movement. The gradual, increasing slope of the movement profile in the space-time representation generates herein a relative movement of the image relative to the light modulator, which is counter to the relative movement between light modulator and printing plate, compensating the movement. During the slopes of the sawtooth according to the invention, in the shortest possible time, ideally in infinitely short time, the image of the light modulator on the printing plate is reset abruptly to the basic position in preparation for the jumping-over of the data pattern to the next data row on the light modulator.

It is especially advantageous in the physical form of the invention if the movement profile is synchronized with the displacement of the data patterns between the rows, wherein in particular the gradual, increasing slope is executing during the holding time.

Since it is virtually not possible to generate an infinitely fast movement, the steep, decreasing slopes in the space-time diagram will not be able to be perpendicular. If, therefore, in a special physical form of the invention the light source is switched off during the steep, decreasing slopes, it is advantageously attained that even during the steep, decreasing slopes in the movement profile no blurring of the image on the printing material occurs. Through this measure within the scope of the invention also a periodic movement profile could be selected which does not have a steep, decreasing slope. The decreasing slope can, for example, in terms of magnitude have the same inclination as the increasing slope.

In another advantageous embodiment form of the method according to the invention all light-modulating cells are switched inactive during the steep, decreasing slope. Through this measure a blurring of the image of the light modulator on the printing material is also prevented even during the decreasing slopes. This occurs even if the decreasing slope in practice has a finite temporal width. The effect of this measure is therefore as a result the same as switching off the light source during the decreasing slope.

According the invention the light modulator can be mechanically moved, in particular tilted and/or displaced, in order to move the image of the data pattern. In this way, with advantage a relative movement between the image of the light modulator on the printing plate and the light modulator itself can be generated. Through the mechanical movement of the light modulator the system receives an additional degree of freedom, which makes it feasible to move the image of the light modulator in principle relative to the light modulator as well as relative to the printing plate independently of the constant relative movement between light modulator and printing plate.

According to another preferred embodiment form of the method according to the invention the image optical path is displaced in order to move the image of the data pattern. A displacement of the image optical path can be generated by inserting a suitable optical element into the optical path between light modulator and printing plate without the light modulator itself needing to be moved.

In further physical form of this variant of the method according to the invention an electric voltage, utilizing an electro-optical effect, in particular the Kerr effect, is varied, in order to displace the image optical path. For example, a Kerr cell which is operated with a variable voltage can be inserted into the imaging optical path. Herein the optical properties, in particular the refractive index, of the Kerr cell is changed through the applied electric voltage. The advantage of this measure is that no mechanically movable parts are required in order to generate the movement according to the invention of the image of the data pattern relative to the light modulator.

Alternatively, and/or additionally, according to the invention a deflection minor and/or a lens and/or a prism and/or a camera wedge can be moved mechanically in order to displace the imaging optical path. The aforementioned optical elements are disposed in the imaging optical path between the light modulator and the printing plate.

According to the invention a dispersive element can also be disposed in the imaging optical path and the wavelength of the light source be modulated in order to displace the imaging optical path. For example, a grating or a prism can be introduced into the imaging optical path such that the picture position of the light modulator on the printing material to be exposed depends on the exact wavelength of the light emitted by the light source. The wavelength of the light emitted by the light source is subsequently usefully modulated for the generation of the desired movement profile of the image of the light modulator relative to the light modulator. This embodiment form has the advantage that no mechanically movable parts are necessary for the generation of the periodic movement.

Another preferred embodiment variant of the method according to the invention provides that the light sensitive material is mechanically moved in order to move the image of the data pattern. For example, in systems, in which the light modulator can be traversed over the printing plate, the additional periodic movement can be induced through periodic moving of the printing plate. In this case the relative movement between light modulator and the material to be exposed, with suitable selection of the movement profile of the printing plate, during the holding times is cancelled such that the image of the light modulator on the printing plate is kept stationary during the holding time. This is, in principle, an alternative embodiment compared to the embodiment above, according to which the image of the light modulator is moved relative to the light modulator. The embodiment forms are, however, also combinable within the scope of the invention.

According to an advantageous variant of the method according to the invention, the holding time is selected to be smaller than the reciprocal of the displacement rate. In this manner, without a mechanical movement, as in the previously described embodiment examples, and also without reducing the image of the light modulator, as in the above acknowledged prior art, it can be attained that a blurring of the image due to the relative movement during the holding time is substantially virtually avoided. Complex and expensive measures for the compensation of the movement during the holding time or for the reduction of the image can therefore advantageously be occasionally superfluous. The precondition is that a sufficiently strong light source with corresponding luminous flux is utilized, such that a shortening of the effective exposure time leads nevertheless to a complete exposure. According to prior art, in comparison, the holding time corresponds substantially to the reciprocal of the displacement rate.

In another favorable physical form of the method according to the invention the light source is operated pulsed and/or the light modulator is periodically switched inactive in order to reduce the holding time.

The problem addressed by the present invention is also solved through an exposure and modulation arrangement of the above described type, which includes means for compensation of the relative movement between the light modulator and the light sensitive material, in order to hold substantially stationary the image of the data pattern during the holding time relative to the light sensitive material. Hereby, with advantage, during the holding times the relative movement can be cancelled in order to prevent that blurring occurs of the exposed image during the holding time through the constant relative movement between light modulator and printing plates. Within the scope of the invention it is similarly feasible to effect the compensation of the relative movement thereby that the light sensitive material is additionally moved via a drive, or thereby that the light modulator is moved through an appropriate driving relative to the light sensitive material.

The problem addressed by the invention is also solved through an arrangement of the above type which includes means for the displacement of the imaging optical path relative to the light modulator in order to hold substantially stationary the image of the data pattern during the holding time relative to the light sensitive material. This measure can be employed independently of, or additionally to, the above said compensation of the relative movement between light modulator and light sensitive material. According to this solution alternative of the invention through a variable optical element the imaging optical path is deflected. The system receives thereby an additional degree of freedom since the image can be moved relative to the light modulator.

If in embodying of the invention the means for displacement comprise a mechanically movable optical element, in particular a lens and/or a prism and/or a mirror and/or a camera wedge, in a special physical form of the arrangement according to the invention the displacement of the image with respect to the light modulator can be especially favorably realized with the goal of reducing the displacement of the image of the light modulator on the light sensitive material during the holding times.

According to another advantageous physical form of the arrangement according to the invention, the means for displacing comprise a dispersive element, in particular a grating and/or a prism, and the light source comprises means for varying their wavelength. In this manner with advantage the wavelength of the emitted light can be varied in time such that, due to the wavelength-dependent deflection of the dispersive element, a movement takes place of the image of the light modulator relative to the light modulator.

According to a further preferred embodiment form of the arrangement according to the invention the means for displacement comprise an electro-optical element, in particular a Kerr cell, and a variable voltage source for activating the electro-optical element is provided. Herewith, by varying the variable voltage, the refractive index of the Kerr cell can be changed periodically in order to move also the image of the light modulator relative to the light modulator, with the goal of imaging the image during the holding time stationarily on the printing plate.

An advantageous physical form of the invention provides that the means for compensation comprise means for modulating a periodic movement, in particular piezoelectric drive, onto the light modulator and/or the light sensitive material. The piezoelectric drive has the advantage that the requisite small deviations in the μm range can be generated directly, e.g. without transmission or gearing and with high precision and dynamically. As the means for modulating the periodic movement an oscillator coil can also be utilized. An oscillator coil, by building up a magnetic field due to current flow, is capable of moving a membrane and to generate in this manner a mechanical movement.

In an advantageous further development of the arrangement according to the invention it is provided that the means for modulation and/or the means for displacing include an energy store, which is developed for storing and outputting energy during a periodic movement. The energy store can be realized for storing mechanical, electrical, magnetic or any other form of energy. The energy store can be charged during a slow constant movement, for example with the increasing slope of a sawtooth movement in order to release its energy abruptly for the generation of a fast reset movement, for example corresponding to the steep slope of a sawtooth. This embodiment, on the one hand, is energy efficient, for another, the capability for generating a mechanical sawtooth-like movement is especially favorable for the application, since during the holding time a constant movement must be generated, whereas after the passage of the holding time, immediately before the data pattern jumps over into the next row of the light modulator, a jolt-like reset movement is required.

In further advantageous physical form of the arrangement according to the invention the means for modulating-onto and/or the means for displacing comprise a solid-body bearing. Hereby is meant that for the movement neither rollers, cylinders, tracks nor a sliding movement is required. Instead, the element to be moved is connected with solid connections for example with the exposure unit, wherein the solid connections, however, can be deformed through the drive in the elastic range. Such a solid-body bearing has the advantage that a precise guidance can be attained on small space with low complexity and expenditure.

The problem addressed by the invention is furthermore solved through a method of the aforementioned type, in which the displacement rate is so selected that the quotient of the relative speed and the product of the displacement rate and the height of the light-modulating cells is at least two, in particular two. Hereby, with advantage the data rate to the display is reduced, in particular halved. This is due to the fact that the data pattern according to the invention is updated only every second or every Nth line, wherein N>2. The throughput can advantageously be increased since, at given maximal data transmission rate, the relative speed can be set high. The exposure process can thus be carried out with advantage in a type of "high-speed mode".

If the method according to this aspect of the invention is additionally implemented according to one of claims 1 to 15, the throughput can be increased while simultaneously a substantially blurr-free quality is maintained. The increase according to the invention of the throughput by lowering the data quantity to be transmitted is thus according to this physical form of the invention combined with the above described measures for compensating the blurriness.

The invention will be described by example in a preferred embodiment form with reference to a drawing, wherein further advantageous details can be found in the Figures of the drawing.

BRIEF DESCRIPTION OF THE DRAWINGS

Parts identical in function are herein provided with the same reference symbols.

The Figures of the drawing show in detail:

FIG. 1 shows schematically an exposure and modulation arrangement 1. A light source 2 is imaged on a two-dimensional light modulator 4 using a first lens 3. The light modulator is a micromirror matrix (DMD®) with individually tiltable micromirrors disposed in rows and lines, each of which acts as a light valve. The rows of the micromirror matrix extend perpendicularly into the plane of drawing, whereas the lines extend in the plane of drawing. Accordingly, in FIG. 1 is evident a line comprised of seven rows.

DETAILED DESCRIPTION OF THE INVENTION

Figure 1:
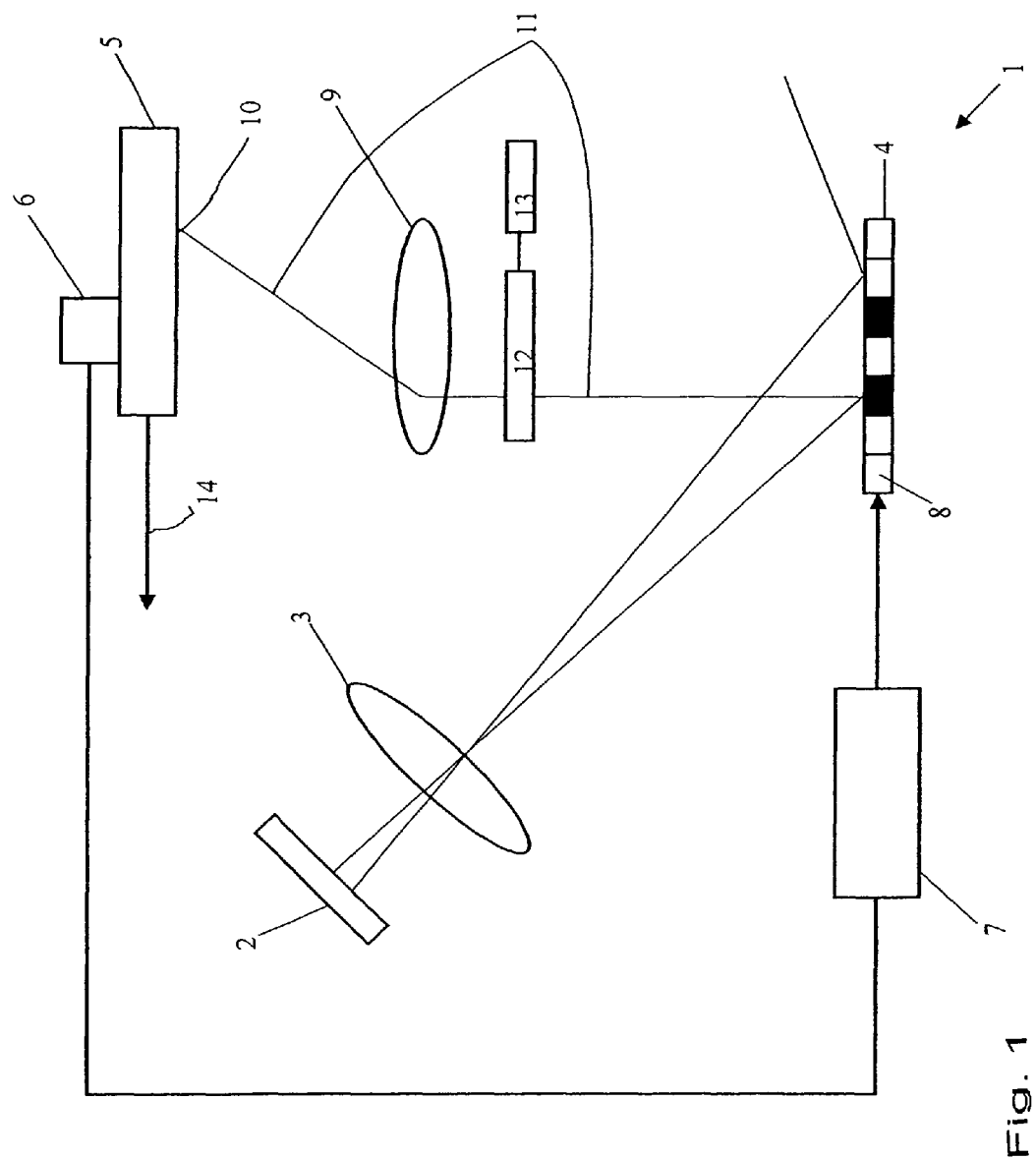
FIG. 1 a schematic representation of the complete exposure and modulation arrangement.

The position of the light sensitive material 5 relative to the light modulator 4 is variable through a positioning device 6. The relative movement takes place in the direction parallel to the lines of the DMD 4, thus perpendicularly to the rows. Data patterns are transmitted into the first column with cells 8 of the light modulator 4 using a driver circuit 7. Important is herein the synchronization of the data pattern transmission and of the relative movement between light modulator 4 and light sensitive material 5. The data pattern transmitted into the first row is here displayed during a holding time. The holding time corresponds substantially to the reciprocal of the picture rate at which data are updated on the light modulator 4. The data pattern is subsequently displaced from the first row in the direction of the relative movement into the next row, such that the data pattern transmitted onto the light sensitive material 5 remains substantially stationary on this material. The light modulator 4 is comprised of several rows of cells 8. The data pattern transmitted onto the light modulator 4 is comprised of combinations of activated and inactivated cells 8. If the cells 8 are activated, the light incident on them is transmitted via a second lens 9 onto the light sensitive material 5. The light incident on inactive cells, is deflected away from the light sensitive material 5.

The image of a data pattern displayed on cells 8 of a a row of the light modulator 4 is denoted by the reference number 10. The exposure and modulation arrangement 1 is generally stationary. The above described basic structural components of the exposure and modulation arrangement 1 correspond to those employed in prior art. In addition to the known structural components, the exposure and modulation device 1 depicted in FIG. 1 includes in the imaging optical path 11 between the light modulator 4 and the light sensitive material 5 a Kerr cell 12 only indicated schematically. The Kerr cell 12 is activatable via a variable voltage source 13, which here is also only indicated schematically. The Kerr cell 12 is disposed in FIG. 1 by example in the segment between the light modulator 4 and the lens 9 of the imaging optical path 11. However, it is also conceivable that the Kerr cell 12 is disposed in the segment between the lens 9 and the light sensitive material 5 of the imaging optical path 11.

Figure 2:
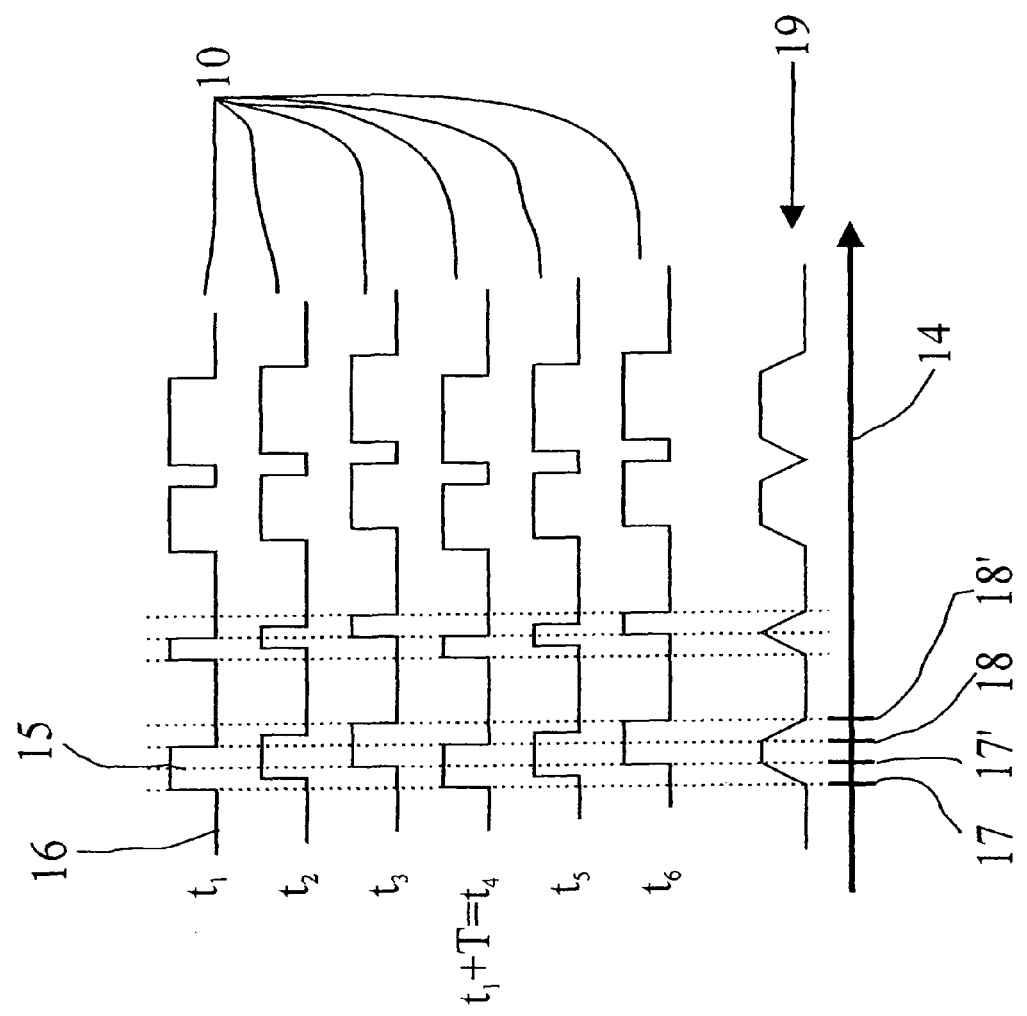
FIG. 2 one-dimensional representation of the position of the exposure pattern on a printing sheet at different points in time $t_1, t_2, \ldots t_6$, as well as the exposure cumulative in time during exposure according to prior art.

As an illustration of the disadvantage of conventional exposure and modulation arrangements, FIG. 2 depicts schematically in a diagram the spatial position, of the image 10 of the data pattern displayed on the light modulator 4. In the diagram in the horizontal direction a spatial axis 14 in the direction of the relative movement, impressed through the positioning device 6, of the light sensitive material 5 is depicted. Above the spatial axis 14 of the light sensitive material 5 is depicted the image 10 of the data pattern displayed on the light modulator 4 at different points in time $t_1, t_2, \ldots, t_6$. With each exposure pattern the illuminated sections 15 are indicated by a digital "1" signal, whereas nonilluminated sections 16 are illustrated by a digital "zero" signal. The exposure pattern $t_1$ is illustrated in the uppermost line above the spatial axis 14. In the line following below, the exposure pattern on the printing sheet 5 is depicted at a point in time $t_2$, wherein $t_2=t_1+\Delta t$, with $\Delta t<T$, wherein T is equal to the holding time. As can be seen the exposure pattern $t_2$ is minimally displaced toward the right on the spatial axis 14 compared to the exposure pattern $t_1$. This can be clearly seen by the displaced positions of the illuminated sections 15. Since the light modulator 4 and the printing plate 5 move at a constant speed relative to one another, the illustrated displacement of the illuminated sections 15 on the spatial axis 14 on the printing plate 5 occurs during the holding times.

The exposure pattern $t_3$ corresponds to the exposure pattern displayed on the printing plate 5, thus to the image 10 of the light modulator 4, at a time $t_3$, wherein $t_3-t_1<T$, with the holding time T of the data pattern on the light modulator 4. As can be seen, in the exposure pattern $t_3$ a further displacement along the spatial axis 14 of the illuminated sections 15 can be observed. The starting position 17 of the illuminated section 15 at time $t_3$ is displaced on the spatial axis 14 toward the displaced starting position 17' displaced on the printing plate 5. The end position 18 of the exposure pattern $t_1$ is also displaced at time $t_3$, corresponding to the exposure pattern t3, toward the displaced end position 18' on the printing plate 5.

At time $t_4$, wherein $t_4=t_1+T$, the illuminated section 15 on the spatial axis 14 of the printing sheet 5 is again located between the original starting position 17 and the original end position 18 corresponding to the exposure pattern $t_1$. On the light modulator 4 the data pattern has jumped over onto the adjacent row between time $t_3$ and time $t_4$. The exposure pattern $t_3$ corresponds therefore exactly to the exposure pattern $t_1$.

The exposure patterns $t_5$, $t_6$ correspond to the exposure patterns $t_2$ and $t_3$, respectively, in order to illustrate that the process repeats. Again, a displacement of the illuminated section 15 on the spatial axis 14 of the printing material 5 occurs during the holding time T, during which a data pattern is held on the light modulator 4. The displacement is due to the constant relative movement between light modulator 4 and printing sheet 5.

As can be seen in the lowest exposure pattern of FIG. 2, the cumulative dose 19 of the exposure on the printing sheet 5 does not exactly correspond to exposure pattern $t_1$, which corresponds to the image 10 of light modulator 4 on the printing sheet 5. Instead, the cumulative dose 19 compared to exposure patterns $t_1, \ldots, t_6$, due to the displacement during the holding time, is disadvantageously blurred in prior art.

The blurring, thus the distance between the starting points 17, 17' and the end points 18, 18', respectively, corresponds on the spatial axis 14 to a spatial displacement corresponding to the product of holding time T and relative speed v between printing sheet 5 and light modulator 4.

Figure 3:
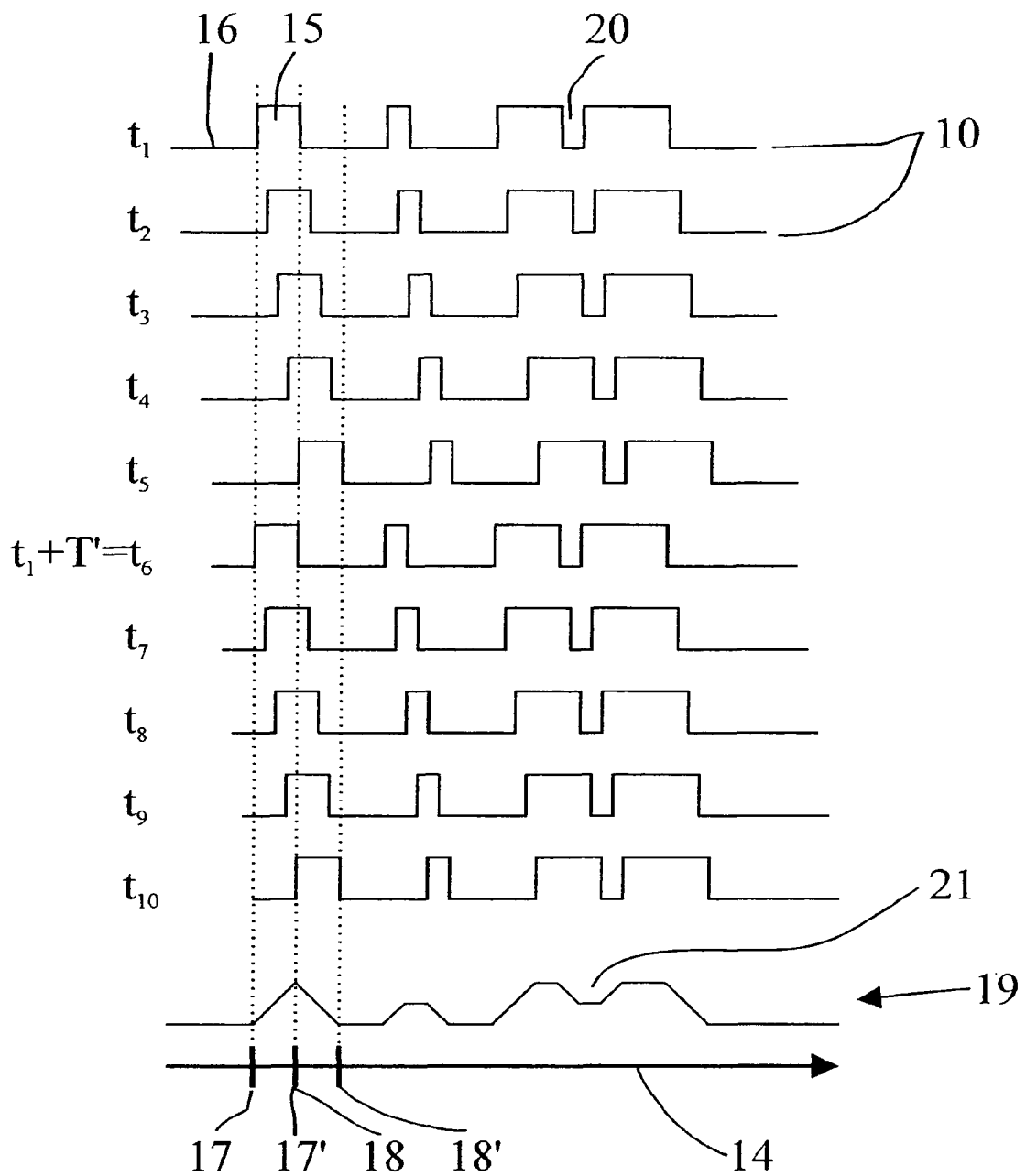
FIG. 3 one-dimensional representation of the position of the exposure pattern on a printing sheet at different points in time $t_1, t_2, \ldots, t_{10}$, during exposure according to one aspect of the invention with a data transmission rate to the light modulator that is half compared to FIG. 2.

In FIG. 3 the same depiction as in FIG. 2 is selected in order to illustrate one aspect of the invention. Compared to FIG. 2, FIG. 3 differs therein that holding time T' is twice as long as holding time T in FIG. 2. As explained above, this leads advantageously to an increase of the attainable throughput in the exposure. Accordingly, only the exposure pattern $t_6$ corresponds to the exposure pattern $t_1$. That means, only at time $t_6$ is on the light modulator 4 the data pattern displaced into the next row, such that the holding time T', during which the image 10 is displaced on the spatial axis 14 of printing sheet 5 is displaced, is twice as long as in the case of FIG. 2. The exposure patterns $t_7, t_8, t_9, t_{10}$ correspond each to the exposure patterns $t_2, t_3, t_4$ and $t_5$, respectively, wherein however at times $t_7, t_8, t_9, t_{10}$ the data pattern on the light modulator 4 is displaced further by one row than at times $t_1, t_2, t_3, t_4, t_5$. As can be seen in the maximally displaced exposure pattern $t_5$ shortly before the data pattern on the light modulator 4 jumps over at time $t_6$, the displacement of the illuminated section 15 along the spatial axis 14 is so distinct that the displaced starting position 17' of the illuminated section 15 coincides with the nondisplaced end position 18 of the illuminated section 15. With the consideration of the cumulative dose 19, this leads to the fact that the rectangular illuminated section 15 in the cumulative dose 19 is, in fact, exposed as a triangular region. In addition, the increased blurring leads to the fact that a narrow, non-illuminated section 20, which is present in the exposure patterns $t_1, \ldots, t_{10}$ corresponding to the data pattern on the light modulator 4, is now only exposed in the cumulative dose 19 as a weakly pronounced indentation 21.

In conjunction with FIG. 3 it becomes consequently clear that an increase of the holding time T after the holding time T' corresponding to the twofold of the holding time T, leads to blurring of the cumulative dose 19 which, for some applications, is not acceptable. An increase of the throughput of an exposure and modulation arrangement 1 by decreasing the data rate on the path of an increase of holding time T and T', respectively, is therefore not possible due to the quality loss.

Figure 4:
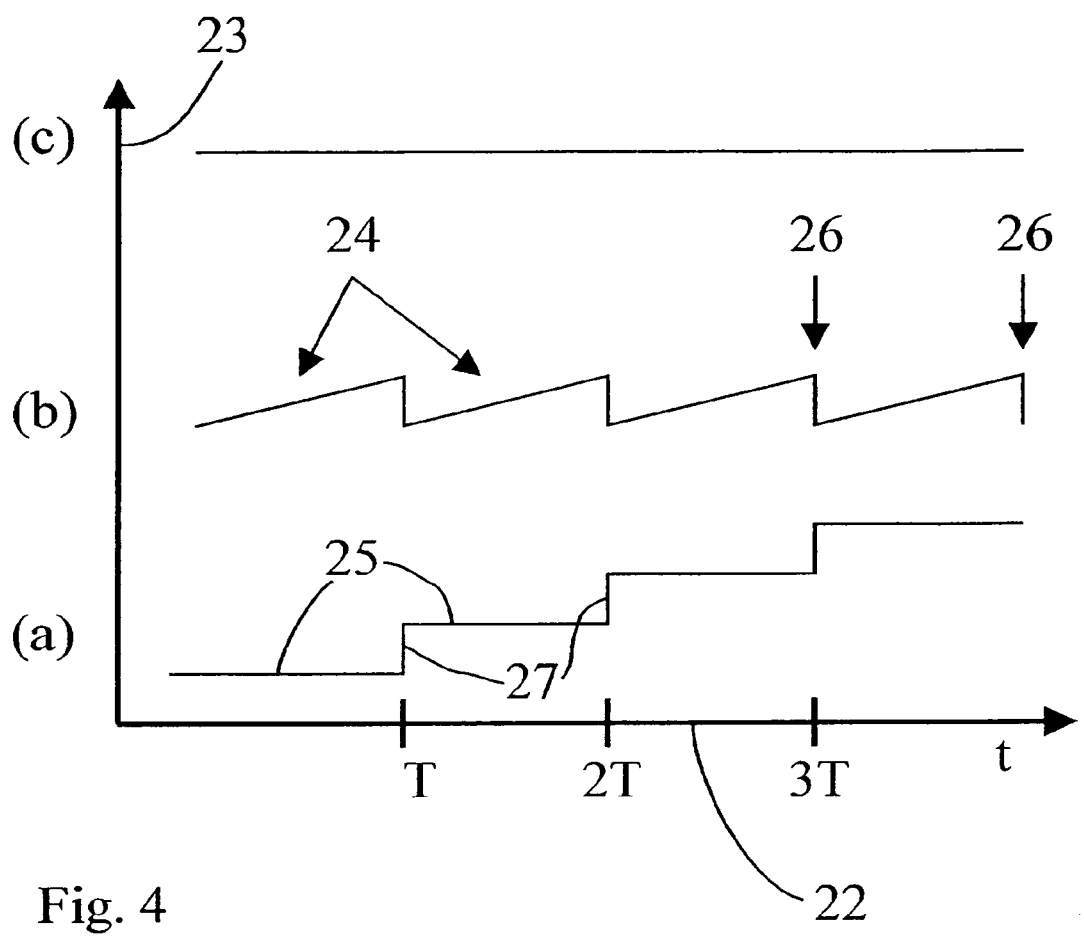
FIG. 4 diagram for the schematic illustration of the time tracing of the position of the picture of the light modulator during exposure according to the invention in representations (a) relative to the light modulator, (b) relative to the position of the light modulator as well as (c) relative to the printing sheet.

FIG. 4 illustrates the principle on which the invention is based. As a function of time t plotted on the time axis 22, on the vertical spatial axis 23 the positions of image 10 of the light modulator 4 are depicted under exposure (a) according to the invention relative to the light modulator, (b) relative to the position of the light modulator compared to the exposure and modulation arrangement 1 as well as (c) relative to the printing sheet. First, in curve (a) can be seen that the picture according to the known scrolling method is moved stepwise over the known light modulator 4. With respect to this curve, the spatial axis 23 corresponds to an axis on the light modulator 4 which extends perpendicularly to the rows. The step width in this depiction corresponds to holding time T.

Curve (b) in FIG. 4 shows the position of image 10 of the light modulator 4 in a time tracing relative to the position of the light modulator, wherein the position of light modulator 4 compared to the stationary exposure and modulation arrangement 1 is measured. As can be seen, according to the invention the image (c) is moved relative to the position of the light modulator periodically with a sawtooth-shaped movement curve. As can be seen, the sawtooth curve is synchronized with the steps of curve (a), thus with the row-wise jumping-over of the data pattern on the light modulator 4. The synchronization is so selected according to the method according to the invention that a relatively gradual, increasing slope 24 is applied during the holding plateau 25 of the data pattern on the light modulator 4. The steep, decreasing slopes 26, which are depicted in FIG. 4*b* idealized perpendicular, corresponding to an infinite speed, are synchronized with the step edges 27 of the movement profile of the data patterns on the light modulator 4.

Lastly, in movement curve (c) in FIG. 4 the position of the image 10 of the light modulator 4 relative to the printing sheet 5 are illustrated idealized, when the method according to the invention is applied. As can be seen, image 10 on the printing sheet 5, due to the periodic sawtooth-shaped movement of the image 10 relative to light modulator 4, which is depicted in curve (b), is entirely stationary. In particular, no blurring occurs as does according to prior art and illustrated in conjunction with FIGS. 2 and 3. Based on the movement of image 10 superimposed according to the method according to the invention with respect to light modulator 4, consequently, the blurring on the printing plate 5 is compensated during the holding times of the data pattern on the light modulator 4. The compensation is complete in the idealized case of a sawtooth curve according to FIG. 4*b* with perpendicularly decreasing slopes 26. Since according to the invention no blurring of the image on the printing plate 5 occurs, to increase the throughput the data rate with which the driver circuit 7 transmits data to the light modulator 4, can advantageously be reduced, although this leads per force to an increase of the holding time T.

In order to generate technically the movement shown in FIG. 4*b* of the image 10 relative to the light modulator 4, in a preferred embodiment of the invention the Kerr cell 12 can be disposed into the imaging optical path 11 before or behind the lens. By varying the voltage source 13, the index of refraction in the Kerr cell 12 is changed as a function of the applied voltage. Hereby the image 10 of light modulator 4 is displaced relative to the light modulator 4.

If the voltage of voltage source 13 has a tracing approximating the sawtooth profile according to FIG. 4b, the image 10 is going to be, relative to the printing plate 5, nearly completely stationary, as is illustrated idealized in curve 4 (c).

Should there be no success in approximating the movement profile of image 10 exactly to the sawtooth according to FIG. 4b, in particular if the steep, decreasing slope 26 can in practice be formed markedly less steep, decreasing, the light source 2 during the decreasing slope 26 can be switched off in order to avoid a blurring of image 10 on the printing plate 5. The light modulator 4 can also be switched completely inactive during the decreasing slope 26 via the driver circuit 7, with the same success as switching-off the light source 2.

The relative movement, according to the invention, according to the movement profile after FIG. 4b, can technically also be realized by mechanically moving the light modulator 4 with respect to the stationary exposure and modulation arrangement 1, in particular by using a piezoelectric drive. It is also feasible to provide the positioning device 6 with an additional drive which impresses an additional movement profile according to FIG. 4b onto the light sensitive material 5.

Lastly, the problem of displacement, occurring, based on FIGS. 2 and 3, in conventional exposure arrangements, can be solved according to the invention by operating the light source 2 pulsed, such that exposure of the printing plate 5 does not occur during the entire holding plateau 25 according to FIG. 4a.

Therewith, according to the invention a method and an arrangement is proposed with which the problem of blurring of the cumulative dose 19 on the printing plate, which occurs as a matter of principle according to prior art, is reduced or eliminated leading to a quality improvement, on the one hand, and, on the other hand, to the feasibility of a throughput increase by reducing the data transmission rate

LIST OF REFERENCE NUMBERS

1 Exposure and modulation arrangement
2 Light source
3 Lens
4 Light modulator
5 Light sensitive material
6 Positioning device
7 Driver circuit
8 Cells
9 Lens
10 Image
11 Imaging optical path
12 Kerr cell
13 Variable voltage source
14 Spatial axis
15 Illuminated section
16 Non-illuminated section
17 Starting position
17' Displaced starting position
18 End position
18' Displaced end position
19 Cumulative dose
20 Narrow non-illuminated region
21 Indentation
22 Time axis
23 Spatial axis
24 Gradual, increasing slope
25 Holding plateau
26 Steep, decreasing slope
27 Step edge

The invention claimed is:

1. Method for the exposure of printing plates (5), in which light from a light source (2) is imaged on a two-dimensional light modulator (4) with a multiplicity of rows of light-modulating cells (8) and is modulated by the modulator, according to which the light modulator (4) is imaged via an imaging optical path (11) on light sensitive material (5), wherein the light sensitive material (5) is moved substantially perpendicularly to the direction of the rows of light-modulating cells (8) relative to the light modulator (4) at a relative speed and wherein the data patterns to be imaged on the light sensitive material (5), starting the first utilized row of the light modulator (4), are displayed sequentially in each row in each instance during a holding time (T, T'), and subsequently are displaced to the succeeding row of the light modulator (4) until data patterns are pushed out of the last utilized row, at a displacement rate through which the image (10) of a given data pattern is, on average, kept stationary relative to the light sensitive material (5), characterized in that the image (10) of the data pattern during the holding time (T, T') is kept substantially stationary relative to the light sensitive material (5),
wherein the relative movement between the light modulator (4) and the light sensitive material (5) is substantially compensated during the holding time,
wherein the light modulator (4) is mechanically moved in order to move the image (10) of the data pattern, and
wherein the mechanical movement of the light modulator is periodic, and is independent from and compensates for said perpendicular movement of the light sensitive material, and thereby keeps the image of the data pattern substantially stationary relative to the light sensitive material.

2. Method as claimed in claim 1, characterized in that the image (10) of the data pattern is moved with a periodic movement profile.

3. Method as claimed in claim 1, characterized in that the imaging optical path (11) is displaced in order to move the image (10) of the data pattern.

4. Method as claimed in claim 3, characterized in that a deflection mirror and/or a lens (9) and/or a prism and/or a camera wedge is mechanically moved in order to displace the imaging optical path.

5. Method as claimed in claim 1, characterized in that the light sensitive material (5) is mechanically moved in order to move the image (10) of the data pattern.

6. Method as claimed in claim 1, characterized in that the holding time (T, T') is selected shorter than the reciprocal of the displacement rate.

7. Method as claimed in claim 6, characterized in that the light source (2) is operated pulsed and/or the light modulator (4) is periodically switched inactive in order to reduce the holding time (T, T').

8. Exposure and modulation arrangement (1) for carrying out the method as claimed in claim 1, with a light source (2), a two-dimensional light modulator (4) with a multiplicity of rows of light-modulating cells (8), with a device (3) for imaging on the light modulator (4), with a device (9) for imaging the light modulator (4) on light sensitive material (5), with a device (6) for generating a relative movement between the light modulator (4) and the light sensitive material (5), wherein the direction of the relative movement extends substantially perpendicularly to the direction of the rows of light-modulating cells (8), as well as with a device (7) for displaying during a holding time (T, T') and subsequent displacement of a data pattern through the several columns of the light modulator (4), at a displacement rate, through which the image (10) of a given data pattern is, on average, kept stationary relative to the light sensitive material (5) during the movement, characterized in that the arrangement includes means (12, 13) for the compensation of the relative movement between the light modulator (4) and the light sensitive material (5) in order to keep the image (10) of the data pattern during the holding time (T, T') substantially stationary relative to the light sensitive material (5).

9. Arrangement as claimed in claim 8, characterized in that the arrangement includes means (12, 13) for displacing the imaging optical path (11) relative to the light modulator in order to keep the image (10) of the data pattern substantially stationary during the holding time (T, T') relative to the light sensitive material (5).

10. Arrangement as claimed in claim 9, characterized in that the means for displacing comprise a mechanically movable optical element.

11. Arrangement as claimed in claim 9, characterized in that the means for displacing include a Kerr cell (12), and that a variable voltage source (13) is provided for activating the electro-optical element (12).

12. Arrangement as claimed in claim 9, characterized in that means for compensation include means for modulating a periodic movement onto the light modulator (4) and/or the light sensitive material (5).

13. Arrangement as claimed in claim 9, characterized in that the means for modulation and/or the means for displacing includes an energy store, which is developed for the storage and output of energy during a periodic movement.

14. Arrangement as claimed in claim 9, characterized in that the means for modulating and/or the means for displacing comprise a solid-body bearing.

15. Arrangement as claimed in claim 8, characterized in that a means for displacement includes a dispersive element, and that the light source (2) includes means for varying its wavelength.

16. Method as claimed in claim 1, characterized in that the displacement rate is so selected that the quotient of the relative speed and the product of the displacement rate and the height of the light-modulating cells is at least two.

17. Method for the exposure of printing plates (5), in which light from a light source (2) is imaged on a two-dimensional light modulator (4) with a multiplicity of rows of light-modulating cells (8) and is modulated by the modulator, according to which the light modulator (4) is imaged via an imaging optical path (11) on light sensitive material (5), wherein the light sensitive material (5) is moved substantially perpendicularly to the direction of the rows of light-modulating cells (8) relative to the light modulator (4) at a relative speed and wherein the data patterns to be imaged on the light sensitive material (5), starting the first utilized row of the light modulator (4), are displayed sequentially in each row in each instance during a holding time (T, T'), and subsequently are displaced to the succeeding row of the light modulator (4) until data patterns are pushed out of the last utilized row, at a displacement rate through which the image (10) of a given data pattern is, on average, kept stationary relative to the light sensitive material (5), characterized in that the image (10) of the data pattern during the holding time (T, T') is kept substantially stationary relative to the light sensitive material (5), wherein the relative movement between the light modulator (4) and the light sensitive material (5) is substantially compensated during the holding time, wherein the image (10) of the data pattern is moved relative to the light modulator with a periodic movement profile, and characterized in that the periodic movement profile in a space-time representation has a gradual, increasing slope (24) and a steep, decreasing slope (26).

18. Method as claimed in claim 17, characterized in that the periodic movement profile is synchronized with the displacement of the data patterns between the rows, wherein the gradual, increasing slope (24) is executed during the holding time (T, T').

19. Method as claimed in claim 17, characterized in that the light source (2) is switched off during the steep, decreasing slope (26).

20. Method as claimed in claim 17, characterized in that all light-modulating cells (8) are switched inactive during the steep, decreasing slope (26).

21. Method for the exposure of printing plates (5), in which light from a light source (2) is imaged on a two-dimensional light modulator (4) with a multiplicity of rows of light-modulating cells (8) and is modulated by the modulator, according to which the light modulator (4) is imaged via an imaging optical path (11) on light sensitive material (5), wherein the light sensitive material (5) is moved substantially perpendicularly to the direction of the rows of light-modulating cells (8) relative to the light modulator (4) at a relative speed and wherein the data patterns to be imaged on the light sensitive material (5), starting the first utilized row of the light modulator (4), are displayed sequentially in each row in each instance during a holding time (T, T'), and subsequently are displaced to the succeeding row of the light modulator (4) until data patterns are pushed out of the last utilized row, at a displacement rate through which the image (10) of a given data pattern is, on average, kept stationary relative to the light sensitive material (5), characterized in that the image (10) of the data pattern during the holding time (T, T') is kept substantially stationary relative to the light sensitive material (5), wherein the relative movement between the light modulator (4) and the light sensitive material (5) is substantially compensated during the holding time, characterized in that a dispersive element is disposed in the imaging optical path (11) and the wavelength of the light source is modulated in order to displace the imaging optical path (11) in order to move the image (10) of the data pattern.

22. Method as claimed in claim 21, characterized in that the image (10) of the data pattern is moved relative to the light modulator (4) with a periodic movement profile, and further characterized in that the periodic movement profile in a space-time representation has a gradual, increasing slope (24) and a steep, decreasing slope (26).

23. Method for the exposure of printing plates (5), in which light from a light source (2) is imaged on a two-dimensional light modulator (4) with a multiplicity of rows of light-modulating cells (8) and is modulated by the modulator, according to which the light modulator (4) is imaged via an imaging optical path (11) on light sensitive material (5), wherein the light sensitive material (5) is moved substantially perpendicularly to the direction of the rows of light-modulating cells (8) relative to the light modulator (4) at a relative speed and wherein the data patterns to be imaged on the light sensitive material (5), starting the first utilized row of the light modulator (4), are displayed sequentially in each row in each instance during a holding time (T, T'), and subsequently are displaced to the succeeding row of the light modulator (4) until data patterns are pushed out of the last utilized row, at a displacement rate through which the image (10) of a given data pattern is, on average, kept stationary relative to the light sensitive material (5), characterized in that the image (10) of the data pattern during the holding time (T, T') is kept substantially stationary relative to the light sensitive material (5),
   wherein the relative movement between the light modulator (4) and the light sensitive material (5) is substantially compensated during the holding time,
   characterized in that an electric voltage (13) utilizing an electro-optical effect is varied in order to displace the imaging optical path (11) in order to move the image (10) of the data pattern; and
   characterized in that the image (10) of the data pattern is moved relative to the light modulator (4) with a periodic movement profile, and further characterized in that the periodic movement profile in a space-time representation has a gradual, increasing slope (24) and a steep, decreasing slope (26).

* * * * *